United States Patent Office 3,318,819
Patented May 9, 1967

3,318,819
COMPOSITION FOR PRESERVING
FATTY MATERIALS
Talmadge B. Tribble and Eugene L. Rondenet, Glenview, Ill., assignors to Flavor Corporation of America, Chicago, Ill., a corporation of Delaware
No Drawing. Filed June 17, 1963, Ser. No. 288,468
4 Claims. (Cl. 252—403)

This invention relates to an improved process and means for treating, stabilizing and preserving fatty products such as organic fats, oils, soaps and like materials.

Rancidity is one of the major contributors to deterioration of fatty materials and is greatly promoted by the influence of air, heat, heavy metal ions, moisture and similar factors. It is well recognized that antioxidant materials may be effectively added to fats and oils, to preserve the same, principally by opposing oxidation and inhibiting related reactions promoted by oxygen and/or peroxides which are thought to be largely responsible for rancidification. Among the more common antioxidants commercially utilized for this purpose are such materials as butylated hydroxytoluene (BHT), butylated hydroxyanisole (BHA), nordihydroguaiaretic acid, ethoxyquin, propyl gallate, ascorbic acid and tocopherol. Certain of these antioxidants appear to be more efficient in combination with one another and therefore various blends and compositions of antioxidant materials are offered commercially as fat preservatives according to the manufacturer's specifications. Rarely, however, do such compositions contain more than approximately 60% active ingredients.

A typical commercial formulation for an antioxidant fat preservative, for instance, comprises 20% BHT, 20% BHA, 10% propyl gallate, 10% citric acid and 40% carrier. In this example, it will be noted that citric acid is included. While citric acid is not an antioxidant by itself, it appears to increase the activity of the commonly used antioxidants, promoting their general effectiveness and capabilities. Citric acid therefore is referred to commonly as a "synergist" in this art because of its apparent ability to increase the activity of the antioxidants over and above their normal capabilities.

While such heretofore known antioxidant compositions and formulations have proven generally successful in their application as preservatives for fats, oils and like fatty substances, nevertheless they are recognizedly limited in their application and effectiveness. Among such limitations is their recognizedly limited capability of preserving fatty substances over prolonged periods. Additionally, most such commercially available antioxidant compositions readily break down and are ineffective at temperatures substantially in excess of 180° F. This means that these known preservative materials have little or no active ability to restrict and control unfavorable oxidative reactions which take place during normal cooking and rendering processes when reducing raw fatty substances to commercial grade products. As a result, present practice dictates the use of this materials by adding the same to the fats after the latter have been rendered and cooled to temperatures below 180° F. This means that normal autoxidative reactions which are accelerated by the extremes of atmospheric oxygen, moisture and heat, present in the rendering processes, remain unchecked during the rendering stages so that the burning of carbonaceous materials and oxidative rancidity take place freely in the rendering stages. This leads to lower quality of the produced fats and cracklings, particularly as to color and free fatty acid values which greatly affect their commercial value. Also unchecked by such known preservatives under present practice are the offensive odors which familiarly accompany rendering processes, due in a large part to the deterioration and burning of the fatty materials during the cooking stages.

In the area of edible fats, particularly those used in animal foods, for example, such presently known synthetic antioxidant preservatives are further subject to certain limitations and restrictions of use due to their known toxic effects at higher percentages. Consequently, tallows and greases which are preserved by presently known antioxidant preservatives, applied within their permissible non-toxic limits, cannot, as a rule, be sufficiently stabilized against rancidity thereby, to prevent their eventual contamination and loss of quality and palatability.

In view of the above briefly mentioned and other recognized limitations characteristic of presently known fat preservers and stabilizers, there is a marked demand for an improved fat preserving means and it is to this that the present invention is directed.

In brief, the present invention embodies the discovery that when known antioxidant materials, such as those listed hereinabove, are combined with ortho aminobenzoic acid (anthranilic acid) or its esters, such as methyl anthranilate and ethyl anthranilate, the same demonstrate markedly improved preserving characteristics and capabilities for opposing oxidation and inhibiting the oxygen promoted activities which generally are considered responsible for rancidification of fats, oils, soaps and other like fatty materials.

In embodying this discovery in the present invention, various combinations of antioxidant materials and anthranilic acid, or its esters, such as methyl anthranilate or ethyl anthranilate, ranging from substantially one part of anthranilic acid or its ester equivalent to 99 parts antioxidant, and vice versa, were employed for fat preserving purposes. In each instance, the ingredients combined according to this invention produced markedly improved results over those obtainable by using any of the individual ingredients alone or when combined according to previously known antioxidant preservative practice. Generally speaking, it was found that compositions embodying a ratio of substantially two parts antioxidant to substantially one part of anthranilic acid, methyl anthranilate or ethyl anthranilate were most effective for general application purposes.

Fat preservatives according to this invention exhibit vastly improved capabilities to stabilize fats and prevent their oxidative rancidity for prolonged periods of time, while being particularly characterized by an improved ability for use at elevated temperatures, more particularly at temperatures in excess of 180° F., without experiencing the usual breakdown of the antioxidants at such temperatures, as heretofore experienced in the art.

With respect to stabilization periods, one of the more accepted methods for determining the degree of stabilization of fats treated with antioxidants is based on the number of hours' protection afforded to the fat. This is determined by the "Accelerated Oxygen Method" of testing stability and is commonly referred to as "Hours A.O.M. Protection." Recognized authorities on fat stabilization, more particularly The American Meat Institute, recommend 20 hours A.O.M. Protection as the minimum standard requirements for preservation of fats. This period is said to be equivalent to substantially six months' protection against rancidity under refrigerated storage conditions. Gauged on this basis, preservatives according to the present invention exhibit consistent capability of prolonging hours A.O.M. Protection, as will appear in greater detail hereinafter.

Another feature characterizing the improved fat preservatives according to this invention lies in their effect on the free fatty acid content and color values of fats stabilized thereby.

It has recently been determined that free fatty acid content of fats is a determinative indication of its rate of oxidative potential. In general, free fatty acid (F.F.A.) results from the breakdown of fat with the dissipation of glycerine, leaving fatty acid. The F.F.A. number of fat analysis refers to the percentage of free fatty acid present, and generally speaking, fats having a low F.F.A. number are preferred and considered to have a greater commercial value and quality than fats with higher F.F.A. numbers. It has been found that fat preservatives according to this invention are very effective in lowering the F.F.A. or free fatty acid content of the treated product.

In addition to the free fatty acid content, the color rating of fat is also commercially important. Color rating is referred to as the F.A.C. color number in fat analysis; the same being based on a color reading matched against samples of fat having standardized colors as recommended by the Fat Analysis Committee of the American Oil Chemists' Society. Generally speaking, the F.A.C. color number usually assays substantially one or two times the F.F.A. acid number and since this ratio appears to be fairly consistent, the two numbers are deemed to have an interrelationship. This relationship is demonstrated by the lowering of the F.F.A. or fatty acid number of fat being accompanied by a lowering of the F.A.C. color number as well. In theoretical consideration, the higher the F.F.A. number of fat, the greater amount of antioxidant required to stabilize the same against oxidative rancidity. Fats having high acid numbers are usually classified as inedible and unfit for human consumption, although they are acceptable for use in animal foods. Since the preservative of this invention demonstrates a definite ability to lower the free fatty acid content of fats treated therewith, it likewise has the ability to lower the F.A.C. color number, thereby resulting in finished greases and tallows having low F.A.C. color ratings.

Still another characterizing feature of preservatives according to this invention resides in the apparent continuing operative activity of the antioxidant material employed in the treated fats after rendering. This continuing antioxidant activity brings about a progressive decline in both the acid and color number values of fats treated according to this invention even after the same are placed in storage after rendering. This unexpected feature therefore causes fats treated with the antioxidant preservatives of this invention to show progressive improvement in F.F.A. acid number and F.A.C. color number while in storage, resulting in improvement of their commercial value.

From the foregoing brief description of this invention, it will be understood that the same provides an improved means for preserving fats and like substances, with particular effectiveness in preventing their rancidification. Among its more remarkable characteristics is its demonstrated ability to promote and sustain the normal effectiveness of known antioxidant preservative materials, heretofore used in this art, particularly at temperatures above their normal breakdown temperatures, so that the same may be effectively added to the fatty materials during the rendering and cooking processes. Thus, the antioxidant ingredients of preservatives according to this invention effectively combat oxidative reactions which take place during rendering processes, including but not necessarily restricted to controlling the burning of carbonaceous materials and other oxidative reactions thought to cause rancidity. This feature desirably produces a marked depression in the production of offensive odors which normally accompany presently known rendering processes. In addition to capabilities of the present invention to effectively activate antioxidants at elevated temperatures, the latter also exhibit progressive effectiveness after rendering, at temperatures below their normal breakdown temperatures. As a consequence, the present invention provides new and improved means for treating and preserving fats over prolonged periods.

The main object of this invention is to provide a new and improved means for preserving organic fatty materials.

Another object of this invention is to provide a new and improved fat preserving process which is effective in preventing rancidification of treated fats over prolonged periods.

Still another object of this invention is to provide a new and improved means for preserving and treating fats which effectively promotes the activity of antioxidant materials, particularly at temperatures in excess of their normal breakdown temperatures.

Another important object of this invention is to provide a new and improved fat preserving means, as aforesaid, which is operationally effective to deter the burning of carbonaceous materials and oxidative rancidification, air pollution and offensive odors which characteristically accompany normal fat rendering processes.

Still another important object of this invention is to provide a new and improved means for preserving fats, oils and like fatty materials which is capable of lowering the free fatty acid and color number values of the end product, while improving overall quality thereof for sustained periods of time.

Still another important object of this invention is to provide a new and improved means for preserving fats and like materials having high precentages of free fatty acid without employing antioxidants in toxic percentages.

A still further and additional important object of this invention is to provide an improved antioxidant preservative for fats and like materials which is operative in the presence of fat during the rendering process and remains operative after the fat has been rendered and stored.

Having thus described our invention, the best mode presently contemplated for carrying out its teachings and concepts shall now be set forth so as to enable those skilled in the art to practice the same.

Some of the results produced by the present invention are illustrated in the following table:

TABLE 1.—NORMA-HOFFMAN STABILITY

| | Sample Treated at Temperatures Below 180° F. | Time to 5-lb. pressure drop—Norma-Hoffman Bomb Test (hrs.) |
|---|---|---|
| 1 | Untreated choice-grade tallow | 2.0 |
| 2 | Tallow plus 0.05% Anthranilic acid | 2.0 |
| 3 | Tallow plus 0.05% methyl anthranilate | 3.0 |
| 4 | Tallow plus 0.05% citric acid | 2.5 |
| 5 | Tallow plus 0.025% citric acid plus 0.025% anthranilic acid | 3.0 |
| 6 | Tallow plus 0.05% BHA | 3.0 |
| 7 | Tallow plus 0.05% BHA plus 0.025% anthranilic acid | 3.5 |
| 8 | Tallow plus 0.05% BHT | 5.0 |
| 9 | Tallow plus 0.05% BHT plus 0.025% anthranilic acid | 5.5 |
| 10 | Tallow plus 0.009875% BHT plus 0.0046875% methyl anthranilate | 3.75 |
| 11 | Tallow plus 0.0046875% BHT plus 0.00234375% methyl anthranilate | 2.5 |

It will be noted that the information of Table 1 demonstrates the stability of choice-grade tallow, both in an untreated state, or, that is, without synthetic preservatives added thereto, and the comparative effect of certain recognized antioxidant preservative materials thereon, along with the improved results obtained by the preserving means of this invention. The indicated results were obtained by treating the rendered tallow at temperatures below 180° F. according to the Norma-Hoffman bomb test as specified by the American Oil Chemists' Society. In this respect, the Norma-Hoffman test determines the time required for the fat sample to oxidize under certain accelerated conditions. This is brought about by placing the sample in an enclosed chamber into which excessive oxygen is introduced until an atmosphere having a constant pressure, substantially 15 p.s.i. is obtained. Thereafter heat is applied to the chamber or bomb and the time required for the bomb's atmospheric pressure to drop 5 p.s.i. is then measured as determining the time required for the sample to oxidize. Viewed in another manner, this time is indicative of the oxygen interception ability of the stabilizing additive. Thus, the hour figures set out in Table 1 indicate the time required for oxidation of the test sample under the accelerated test conditions, with the higher time values indicating a greater resistance to oxidation.

As noted, sample 1, the untreated choice-grade tallow, had a bomb test time of two hours. It will be noted that the addition of .05% methyl anthranilate to the tallow (sample 3) resulted in a bomb test time of 3 hours, showing a marked increase in the treated tallow's ability to resist oxidation. It is also noteworthy that the addition of citric acid to the tallow, as demonstrated by sample 4, served to increase the bomb test time for the tallow by 5/10 hours, while in sample 5, the addition of one-half the amount of citric acid employed in sample 4 plus an equal amount of anthranilic acid resulted in a bomb test time greater than that obtained by sample 4, treated with the citric acid.

The results obtained from samples 6 and 7 in the above table illustrate the ability of anthranilic acid, according to this invention, to increase the antioxidant effect of BHA, with similar relationship as to BHT being demonstrated by the observed results of samples 8 and 9.

The results of utilizing comparatively minor non-toxic amounts of BHT and methyl anthranilate in combination are found in the results obtained from samples 10 and 11 which compare favorably with results obtained from sample 7, for example, containing toxic percentages of the antioxidant. In this respect, the recognized total toxic limit for the antioxidant additives, such as BHT or BHA, is 0.02% for edible fats prepared for human consumption and 0.5% for fats used in animal feeds.

The most effective results obtained appear in sample 9 wherein BHT and anthranilic acid are combined in a ratio of substantially 2:1 and a total additive percentage of 0.075%, giving an extended bomb test time of 5.5 hours, compared to the untreated tallow bomb test time of the 2 hours, as seen in sample 1. Generally speaking, it is apparent that the utilization of methyl anthranilate or anthranilic acid, particularly in combination with known antioxidants such as BHA or BHT, effectively extends the stability of the tallow in accordance with that objective of this invention.

The following table serves to set forth the results produced by this invention in treating the same choice-grade tallow employed in the samples of Table 1 at temperatures in excess 180° F.

TABLE 2

| | Sample Treated at Temperatures Below 180° F. | Time to 5-lb. pressure drop—Norma-Hoffman Bomb Test (hrs.) |
|---|---|---|
| 12 | Choice-grade tallow plus 0.009875% BHT plus 0.0046875% methyl anthranilate, treated at 250° F | 3.75 |
| 13 | Sample 12 treated at 475° F | 2.75 |

The results of Table 2, like those of Table 1, were obtained under the Norma-Hoffman Bomb Test for oxygen interception and, as indicated by sample 12, the addition of a rather minor percentage of methyl anthranilate and BHT to the tallow effectively extended the hours of stability, at the elevated temperature of 250° F., which is in excess of the normal expected breakdown temperature of approximately 180° F. for BHT. It will be recognized also that sample 12 of Table 2 is identical to sample 10 in Table 1, with the comparative results obtained demonstrating the ability of this invention to maintain and promote the effectiveness of the known antioxidants, such as BHT, when added to fats at elevated temperatures. This is further borne out by the results of sample 13 wherein the same proportions of BHT and methyl anthranilate were added to the choice-grade tallow as were employed in sample 12, but at an excessive temperature of 475° F.

The following table further serves to illustrate some of the results obtained by the present invention, based on A.O.M. stability findings.

TABLE 3.—HOURS A.O.M. STABILITY

| | Sample Treated at Temperatures Below 180° F. | A.O.M. Stability (hrs.) |
|---|---|---|
| 1 | Untreated choice-grade tallow | 5 |
| 2 | Tallow plus 0.05% citric acid | 5.5 |
| 3 | Tallow plus 0.05% anthranilic acid | 7.0 |
| 4 | Tallow plus 0.05% methyl anthranilate | 5.5 |
| 5 | Tallow plus 0.018875% BHT plus 0.009875% methyl anthranilate (0.028625% total). | 81 |
| 6 | Tallow plus 0.018875% BHT plus 0.009875% methyl anthranilate plus 0.05% citric acid (0.07625% total). | 113 |
| 7 | Tallow plus 0.0375% BHT plus 0.01875% methyl anthranilate (0.056% total). | 113 |
| 8 | Tallow plus 0.05% BHT plus 0.025% anthranilic acid (0.075% total). | 121 |

As previously mentioned, the A.O.M. Protection, as specified by the American Meat Institute, recommends 20 hours A.O.M. as the standard for preservation of fats, under refrigerated conditions. The untreated choice-grade tallow of Table 3, sample 1, demonstrates an A.O.M. stability of five hours. By adding .05% citric acid to the tallow (sample 2) at temperatures below 180° F., the A.O.M. stability was increased by 5/10 hours. By comparison, in sample 3, the addition of .05% anthranilic acid to the tallow increased its A.O.M. stability to 7 hours, while the substitution of the same percentage of methyl anthranilate in sample 4 produced results equivalent to that produced by the citric acid additive utilized in sample 2. Sample 5 shows the effect of using non-toxic percentages of the antioxidant according to this invention. It also will be noted that the hours A.O.M. obtained from samples 6 and 7 are identical, although the total percentage of the additive ingredients employed in sample 7 is substantially less than that employed in sample 6. In this respect, the percentages of BHT and methyl anthranilate in sample 7 are twice the percentages of those ingredients in sample 6, but the citric acid has been eliminated from sample 7. In each instance, however, the BHT and methyl anthranilate bear a ratio of substantially 2:1.

Sample 8 of Table 3 shows the greatest number of hours A.O.M. stability obtained utilizing BHT and anthranilic acid in a ratio of 2:1 and a total ingredient percentage just slightly less than that utilized in sample 6, wherein the BHT and citric acid combination of the previously known practice was employed.

The effect of elevated temperatures on tallows treated with presently known and commercially available antioxidant preservatives and the improved results thereover produced by the present invention are illustrated in the following table.

TABLE 4

| | Samples Treated at Temperatures Greater than 180° F. | A.O.M. Stability (hrs.) |
|---|---|---|
| 9 | Choice-grade tallow plus 0.05% of a commercial antioxidant mixture comprising 20% BHT, 20% BHA, 10% propyl gallate and 10% citric acid (0.03% total active ingredient) treated at 180° F. | 37 |
| 10 | Sample 9 treated at 300° F. (resulted in breakdown of antioxidant). | 0 |
| 11 | Choice-grade tallow plus 0.009875% BHT plus 0.0046875% methyl anthranilate treated at 180° F. | 75 |
| 12 | Sample 11 treated at 300° F | 102 |

Table 4 sets forth the hours A.O.M. stability obtained by adding antioxidant preservatives to tallows at temperatures of 180° F. or greater. For example, in sample 9, a choice-grade tallow was treated with a known antioxidant preservative formulation comprising, BHT, BHA, propyl gallate and citric acid in the respective percentages indicated and applied to the tallow at 180° F. As shown, sample 9 produced 37 hours A.O.M. stability. In treating sample 9 at 300° F. (sample 10), however, it will be observed that a complete breakdown of the antioxidants occurred resulting in full oxidation of the tallow or, that is, zero hours A.O.M. stability. In sample 11, the combination of BHT and methyl anthranilate in the ratio of 2:1 according to this invention was added to the tallow at 180° F. and the resultant hours A.O.M. stability obtained was substantially twice that obtained by sample 9. By elevating the temperature of sample 11 to 300° F. as indicated in sample 12, greater than 100 hours A.O.M. stability was obtained.

In addition to the ability of the present invention to promote and prolong stability of fats treated thereunder, as exemplified by the results set forth in the above tables, it is also apparent that anthranilic acid and/or its esters, such as methyl anthranilate, promotes the overall effectiveness of antioxidants, such as BHA and BHT, in stabilizing fats, particularly at temperatures in excess of the normal breakdown temperatures for such antioxidants. It will be recalled that heretofore in this art, citric acid has been known to similarly promote the operability and effectiveness of such antioxidants. Typically, therefore, the fat preservatives of the prior art have employed citric acid in combination with antioxidants as exemplified by sample 9 in Table 4. Citric acid, as previously mentioned, is commonly referred to as a "synergist" because of its apparent effect in promoting the activity of the antioxidants. Citric acid, however, is not an antioxidant itself and its effectiveness is not considered to be due to any chemical action that it has on antioxidants, but rather such is attributed in a large part to its ability to intercept metallic ions, changing such ions to salts which are inert to the antioxidants present and thus, permitting the latter to activate to the limit of their capacity. Anthranilic acid and the methyl and ethyl esters thereof, as employed in this invention, likewise appear to promote the activity of the antioxidants with which they are combined. However, such ingredients appear to act both as metallic ion interceptors and peroxide reducers, with the latter aspect of their activity being in the nature of an antioxidant action. This latter action is indicated by the results shown in samples 3 of Tables 1 and 3 above. The following table sets forth additional observed results in this respect.

TABLE 5.—ION INTERCEPTION IN RELATION TO FINAL A.O.M. AND PEROXIDE VALUES

| | Sample | A.O.M. (hrs.) | Pressure Volume at (Hours) |
|---|---|---|---|
| 1 | Choice-grade tallow plus 0.025% copper filings added. | 7.5 | 7.5=21 me./kg. |
| 2 | Sample 1 plus 0.01875% BHT plus 0.009875% citric acid. | 8.5 | 8.5=22 me./kg. |
| 3 | Sample 1 plus 0.01875% BHT plus 0.009875% methyl anthranilate. | 11 | 11=23 me./kg. |

The findings set forth in Table 5 show the improved effect of methyl anthranilate in combination with BHT in the treatment of a choice-grade tallow to which 0.025% copper filings have been added to predicate a condition of excessive metal ions. As will be observed from the indicated hours A.O.M. stability, the untreated choice-grade tallow with the copper filings added shows a 7.5 hour A.O.M. stability (sample 1). In sample 2, BHT and citric acid were added to the tallow with copper filing combination of sample 1 to produce an increased hours A.O.M. of 8.5. In sample 3, the tallow and copper filing combination of sample 1 was treated with BHT and methyl anthranilate preservative according to this invention and in the same percentages employed for BHT and citric acid, respectively, in sample 2. As indicated, a marked increase in hours A.O.M. stability resulted, thereby demonstrating the increased effectiveness of methyl anthranilate on the activity of the BHT over and above that promoted by citric acid.

In the second result column of Table 5 are indicated comparative findings of the Peroxide Value with the choice-grade tallow and copper filing combination showing a peroxide content of 21 milli equivalents of peroxide per kilogram (me./kg.) at the end of 7.5 hours. The recognized limit for oxidation by peroxide content under this testing program for tallows, oils, fats and like substances is 20 me./kg. Thus, the indicated finding of 21 me./kg. peroxide value for sample 1 in Table 5 shows that at the end of 7.5 hours, the tallow was completely oxidized according to the above-indicated oxidation standard. By way of contrast, sample 2 with the BHT-citric acid additive required 8.5 hours to achieve a 22 me./kg. peroxide factor, thus, showing the effectiveness of the BHT-citric acid combination to prolong the period in which the treated tallow of sample 2 reached oxidation. Sample 3, however, treated according to this invention and utilizing methyl anthranilate in combination with BHT antioxidant, required 11 hours to achieve a 23 me./kg. peroxide content, demonstrating thereby a marked improvement in prolonging the time required for the treated tallow to reach oxidation. Viewed in another manner, it may be said that the methyl anthranilate demonstrates a better ability to intercept the metallic ions than citric acid as shown by the increased number of hours required to bring the treated tallow of sample 3 to an oxidized condition.

It will be recalled that one of the objectives of this invention is to provide a fat stabilizing and preserving means, while at the same time enhancing the free fatty acid and color values thereof so as to promote the ultimate commercial worth of the product treated according to this invention. The following table serves to illustrate some of the results produced by this invention in achieving that objective:

TABLE 6.—COMPARATIVE ACID AND COLOR VALUES

| | Sample | F.A.C. Color No. | F.F.A. Acid No. |
|---|---|---|---|
| 1 | Choice-grade tallow (untreated) | 9 | 1.9 |
| 2 | Tallow plus 0.0125% BHT plus 0.00625% citric acid treated at 225° F. | 9 | 1.9 |
| 3 | Tallow plus 0.0125% BHT plus 0.00625% methyl anthranilate treated at 225° F. | Less 3 | 1.2 |

As shown in this table, the untreated choice-grade tallow of sample 1 showed an F.A.C. color number of 9 and an F.F.A. acid number of 1.9. After treating the tallow of sample 1 with a combination BHT-citric acid preservative, as in sample 2, there were no observed changes in either F.A.C. color number or F.F.A. acid number over the sample 1 findings. By way of contrast, the tallow of sample 3, treated according to the present invention with BHT and methyl anthranilate, showed a marked depression in color number to less 3 scale value with a corresponding lowering of the free fatty acid number to 1.2. It will further be observed that both samples 2 and 3 above were treated at 225° F., with the observed results respecting sample 3 of this invention substantiating the ability of the methyl anthranilate to promote antioxidant activity, particularly at elevated temperatures, while lowering the acid and color numbers of the resulting rendered product.

In addition to the ability of the present invention to lower color values and reduce acid numbers when added to the fat during rendering, as above demonstrated, the same also promotes the operative capabilities of the antioxidants after rendering to produce a progressive decline in both acid and color number values. For example, it has been found that a choice-grade white tallow treated with a preservative according to this invention have 0.05% by weight total active ingredients comprising BHT and methyl anthranilate in the ratio of substantially 2:1, had an F.F.A. acid number of 4 and an F.A.C. color number of 5 upon being placed in storage. After three months' storage, the F.F.A. acid number dropped to 0.8 and the F.A.C. color number dropped to 1.0. Thus, it will be understood that fats treated according to the teachings of the present invention show progressive improvement in their color and free fatty acid values and thus, their commercial value, while in storage.

As a corelary of the demonstrated ability of the present invention to reduce F.F.A. and F.A.C. numbers as above indicated, the same is also capable of improving color and odor in rendered fats and cracklings as set out in the observed results of the following table.

TABLE 7.—COMPARATIVE COLOR AND ODOR RELATIONS OF RENDERED FAT AND CRACKLINGS
[Temperatures below 180° F.]

| Raw Charge Treatment | BHT, 0.025%; Citric Acid, 0.0125% | BHT, 0.025%; Methyl Anthranilate, 0.0125% |
|---|---|---|
| Fat After Rendering: | | |
| Color | Dark Brown | Light Cream. |
| Odor | Offensive | Fresh Sweetness. |
| Cracklings: | | |
| Color | Black | Medium Brown. |
| Odor | Offensive | Fresh Sweetness. |
| Factory Air Pollution: | | |
| Odor | Offensive | Pleasant. |

It will be understood that the foregoing table sets forth comparative findings as to color and odor relations for fats and cracklings treated with like percentages of BHT and citric acid and BHT and methyl anthranilate, and as the results indicate, general overall desirable improvement has been obtained both as to color and odor of the rendered fats and cracklings and as to air polution during rendering by the present invention.

Considering the foregoing description, it will be readily understood that the present invention provides improved means for preserving and stabilizing fatty materials for prolonged periods by effectively opposing oxidation and reactions promoted by oxygen which lead to rancidification. It will also be recognized that the present invention is not limited to the particular fatty materials specifically disclosed, but may be utilized in a wide variety of materials containing sufficient fat content to subject the same to rancidity whether of edible or inedible nature. Further, while the examples of the application and observed results obtained by the present invention as heretofore set out describe certain preferred examples of its operative features, it is to be understood that the present invention is not limited to the particulars of either the ingredients or the particular percentages therefor set forth in the above illustrative examples, except as may appear in the following appended claims:

We claim:
1. A composition for preserving fatty materials consisting essentially of butylated hydroxyanisole and member selected from the group consisting of anthranilic acid, methyl anthranilate and ethyl anthranilate combined in the ratio of substantially 2:1.
2. A composition for preserving organic fatty materials consisting essentially of butylated hydroxytoluene and a member selected from the group consisting of anthranilic acid, methyl anthranilate and ethyl anthranilate combined in the ratio of substantially 2:1.
3. A composition for preserving organic fatty materials consisting essentially of substantially 1% to 99% butylated hydroxytoluene and substantially 99% to 1% of a member selected from the group consisting of anthranilic acid, and the methyl and ethyl esters thereof.
4. A composition for preserving organic fatty materials consisting essentially of substantially 1% to 99% of a member selected from the group consisting of butylated hydroxyanisole and butylated hydroxytoluene and mixtures thereof, and substantially 99% to 1% of a member selected from the group consisting of anthranilic acid, methyl anthranilate and ethyl anthranilate.

References Cited by the Examiner

UNITED STATES PATENTS

| 1,864,185 | 6/1932 | Christmann et al., 260—398.5 X |
| 1,869,469 | 8/1932 | Divine _____ 252—403 X |
| 2,369,090 | 2/1945 | Trautman _____ 252—403 X |
| 2,377,029 | 5/1945 | Norris _____ 260—398.5 X |
| 2,518,233 | 8/1950 | Hall _____ 99—163 X |

FOREIGN PATENTS 495,724    9/1953    Canada.

OTHER REFERENCES

"Tenox" The Eastman Family of Food Grade Antioxidants, Chemical Div., Eastman Chemical Products, Inc., Kingsport, Tenn., bulletin G–108 (9162) (p. 2 relied on).

LEON D. ROSDOL, *Primary Examiner.*

CHARLES B. PARKER, *Examiner.*

A. H. SUTTO, M. WEINBLATT, *Assistant Examiner.*